US011854002B2

(12) United States Patent
Abidi (10) Patent No.: US 11,854,002 B2
(45) Date of Patent: Dec. 26, 2023

(54) SYSTEMS AND METHODS FOR CONVERTING PHYSICAL CASH INTO DIGITAL MONEY AT THE POINT OF SALE (71) Applicant: Misam Abidi, Collierville, TN (US)

(72) Inventor: Misam Abidi, Collierville, TN (US)

(*) Notice: Subject to any disclaimer, the term of this patent is extended or adjusted under 35 U.S.C. 154(b) by 0 days.

(21) Appl. No.: 17/096,944

(22) Filed: Nov. 12, 2020

(65) Prior Publication Data
US 2021/0241265 A1 Aug. 5, 2021

Related U.S. Application Data (60) Provisional application No. 62/934,944, filed on Nov. 13, 2019.

(51) Int. Cl.
G06Q 20/38 (2012.01)
G06Q 20/06 (2012.01)
G06Q 20/36 (2012.01)

(52) U.S. Cl.
CPC ....... *G06Q 20/381* (2013.01); *G06Q 20/0655* (2013.01); *G06Q 20/3678* (2013.01); *G06Q 2220/00* (2013.01)

(58) Field of Classification Search
CPC .................. G06Q 20/381; G06Q 20/0655
See application file for complete search history.

(56) References Cited

U.S. PATENT DOCUMENTS

| 7,941,372 | B2* | 5/2011 | Bishop | G06Q 20/10 |
| | | | | 705/40 |
| 8,275,704 | B2* | 9/2012 | Bishop | G06Q 40/00 |
| | | | | 705/26.1 |
| 8,370,265 | B2* | 2/2013 | Coulter | G06Q 20/108 |
| | | | | 380/247 |
| 8,504,415 | B2* | 8/2013 | Hedley | G06Q 20/10 |
| | | | | 705/13 |
| 8,905,303 | B1* | 12/2014 | Ben Ayed | G06Q 20/401 |
| | | | | 235/375 |
| 9,082,119 | B2* | 7/2015 | Ortiz | G06Q 20/3823 |
| 10,115,088 | B2* | 10/2018 | Laracey | G06Q 20/102 |
| 10,115,242 | B2* | 10/2018 | Hedley | G08G 1/0175 |

(Continued)

FOREIGN PATENT DOCUMENTS

JP 6023162 B2 * 11/2016 ........... G06Q 20/108

*Primary Examiner* — Daniel S Felten
(74) *Attorney, Agent, or Firm* — Baker Donelson (57) ABSTRACT

Systems and methods for efficiently managing administration and storage of physical cash by merchants and minimizing loss of physical change by customers resulting from point of sale purchases at merchants by returning change in the form of digital cash electronically deposited to an account. Customers associate financial accounts with the system, such as bank, brokerage and cryptocurrency accounts. Customers select whether to receive all or some of the change digitally. The system includes a physical-to-digital payment processing program configured to deposit electronic cash into customers' accounts, the merchant using the physical-to-digital payment processing program to make the electronic deposit of digital change of the amount of change owed to the customer. In embodiments, the physical-to-digital payment processing program interfaces between a payment processing system of the merchant and a mobile device of the customer.

4 Claims, 6 Drawing Sheets (56) References Cited

U.S. PATENT DOCUMENTS

| | | | |
|---|---|---|---|
| 10,380,564 B1* | 8/2019 | Wilson | G06Q 20/202 |
| 11,367,073 B2* | 6/2022 | Poole | G06Q 20/3224 |
| 2015/0339638 A1* | 11/2015 | DeLuca | G06Q 20/327 |
| | | | 705/39 |
| 2015/0339648 A1* | 11/2015 | Kushevsky | G06Q 20/32 |
| | | | 705/21 |
| 2016/0247131 A1* | 8/2016 | Ahmed | G06Q 20/209 |
| 2018/0096325 A1* | 4/2018 | Panzo | G06Q 20/3278 |
| 2019/0034888 A1* | 1/2019 | Grassadonia | G06Q 20/4012 |
| 2020/0005257 A1* | 1/2020 | Liberty | G06Q 40/02 |

* cited by examiner

SELECT WHERE TO
DEPOSIT YOUR
DIGITAL CHANGE:

| | % | $ |
|---|---|---|
| PRIMARY SAVINGS | 10 | 0.06 |
| PRIMARY CHECKING | 0 | |
| SECONDARY SAVINGS | 0 | |
| BROKERAGE | 90 | 5.65 |
| IRA | 0 | |

( EDIT )   ( ACCEPT )

FIGURE 5B

SYSTEMS AND METHODS FOR CONVERTING PHYSICAL CASH INTO DIGITAL MONEY AT THE POINT OF SALE

CROSS REFERENCE TO RELATED APPLICATIONS

This application claims priority to the following applications, all of which are incorporated by reference herein in their entireties: U.S. Provisional Patent Application 62/934,944 filed Nov. 13, 2020.

FIELD OF THE INVENTION

The present invention relates to computer applications and systems for money processing, and more particularly to systems and methods for converting physical cash into electronic money at the point of sale.

BACKGROUND OF THE INVENTION

The use of physical money presents many problems. Research in 2016 concluded that Americans lose $3.1 billion in pennies alone every year. The study did not include nickels, dimes, quarters and paper bills. Every American has an average of about $60 worth of cash and change laying around in their residence, such as under a couch, in a jar, under a carpet, and so forth. World-wide, it estimated that $2.1 trillion in physical money is lost every year.

Governments spend money creating and administering physical money systems. Lost coins have to be replaced. It is estimated that the U.S. Mint spends 1.5 cents to make each penny. Old paper bills have to be systematically removed from circulation and replaced with new bills. Governments would realize significant savings from a reduction in the amount of physical money in circulation.

Stores spend large amounts managing cash and administering cash transactions. In addition to administration costs, business steadily lose money to theft of cash by employees or others.

For customers, physical change received from an in-store purchase must be carried and stored. Physical change often gets lost, is given away, or is stored somewhere and is never used again. Consumers hold onto cash because they have been brought up to never throw away money, yet consumers throw it away by default, since a lot of change never gets used for future transactions. For most people, loose change is an ever-diminishing concept.

Despite these drawbacks, and the continued proliferation of electronic payment systems, the use of cash persists and is unlikely to go away any time soon. It is estimated that 60% of Americans have less than $1,000 in savings and that 39% of Americans do not have any savings. People with low savings tend to use cash instead of debit or credit cards.

In this era of high-tech, why have we not digitized loose change yet? How much could be saved if there was a better way to manage these pennies? What if there was a better way, a way to help save these tiny increments of value to add up to a big savings, a way to never have to deal with managing physical change again by the customer or the vendor?

The present invention is directed to using web-based electronic and mobile device solutions to address an age-old problem, namely the inefficient use of change received in a physical monetary transaction. For example, the purchaser buys about $9 worth of goods. After the addition of sales taxes, the total price is $10.18. The purchaser hands the store clerk a $50 bill to buy the goods. The change from the $50 bill is $39.82. The cashier gives the purchaser the cash in the form of one $20 bill, one $10 bill, one $5 bill, four $1 bills, three quarters, one nickel, and two pennies. The purchaser most likely puts the paper bills in his or her wallet. He or she might leave some or all of the coins with the cashier (particularly the pennies), put the coins in his pocket, or carry the coins to his car. Once the user gets to his car, he might toss the change into a receptacle in the car, such as a cup holder. If the user put the cash in his pocket, he might wait until he gets home to store the change. On the drive home, some of the coins might fall out of his pocket and end up under his car seat. When he gets home, he empties his pockets and puts the cash in a receptacle of some sort. In either case, there is a good chance that the coins will never be used again. They will sit in the car receptacle, under the car seat, or in the home receptacle for years.

Systems for electronically transferring money from one account to another are well-developed. However, up until now, these systems have operated exclusively with electronic money. Examples of electronic money transfer systems include bank-to-bank transfers (eg. ACH), mobile money transfer apps (e.g. Venmo®), and mobile payment apps (e.g. Apple Wallet®; Google Pay®).

In recent years, a variety of savings apps have come into existence, all of which automatically save money in one form or another for users of the apps. Currently the most utilized savings apps are the "round-up" apps. Round up apps use debit or credit cards and round up the client's purchases to the nearest dollar. The apps then automatically deposit the difference in users savings or investment accounts. Current examples of savings apps include Chime, Qapital, Digit, Acorns, Empower Finance, B of A Keep The Change, Tip Yourself, and EvoShare. However, these apps work only with electronic cash processing systems, not cash.

Existing money transfer and money saving systems suffer from drawbacks such as the following: they do not use cash; they do not digitize loose change; most do not have special investing options; they require the customer to have a card; and most charge fees.

Despite the development and widespread use of digital payment systems and round-up apps, one aspect of money transfer remains a problem. Many purchases are still paid for in physical cash. When a customer pays in cash, he or she currently receives his or her change in the form of physical cash. There is a need for a solution to the inconvenience of carrying loose change, which is inconvenient to carry and store and frequently gets lost, draining money out of customers' pockets and out of circulation. There is no solution in the market that truly digitizes loose change back into an electronic banking environment. There is thus a need for systems and methods that efficiently manage the administration and storage of physical change and eliminate the risk of loss.

OBJECTS AND SUMMARY OF THE INVENTION

It is an object of the inventions to improve the efficient use of cash.

It is an object of the inventions to provide an electronic means for converting physical change into electronic format.

It is another object of the invention to assist consumers with efficiently tracking change and putting it to use, such as through automatic investments.

It is another object to significantly reduce the cost to merchants of managing cash and administering cash transactions.

It is another object of the invention to create an environment that digitizes customers' cash and coins, reducing the amount of lost money.

The foregoing and other objectives are achieved by providing a cash processing system having the features described herein.

In embodiments, the invention includes methods of efficiently managing administration and storage of physical cash by merchants and minimizing loss of physical change by customers resulting from point of sale purchases at merchants, comprising: a customer initiating a purchase at a point of sale of a merchant; the customer paying for the purchase by making a physical cash payment, resulting in an amount of change owed by the merchant to the customer; the customer selecting an electronic deposit of digital cash of all or a portion of the amount of change owed to the customer, in lieu of receiving physical change from the merchant; the merchant accepting the physical cash payment from the customer; the merchant calculating the amount of digital change to electronically deposit to the customer; and the merchant making an electronic deposit of the amount of digital change into a digital account of the customer. In embodiments, the methods include providing a physical-to-digital payment processing program configured to deposit electronic cash into customers' accounts, and the merchant using the physical-to-digital payment processing program to make the electronic deposit of digital change of the amount of change owed to the customer. In embodiments, the physical-to-digital payment processing program interfaces between a payment processing system of the merchant and a mobile device of the customer. In embodiments, the interface of the physical-to-digital payment processing program and the payment processing system of the merchant and the mobile device of the customer is via the cloud, and the physical-to-digital payment process program is provided and administered by an off-site service provider.

Depending on customer preference, the customer selects an electronic deposit of digital change in an amount of all of the change owed by the merchant to the customer. Alternatively, the customer selects an electronic deposit of digital change in an amount of a portion of the change owed by the merchant to the customer and accepts a remaining portion of the amount of change owed by the merchant to the customer in physical cash.

The digital account of the customer can be any of various electronic accounts, such as a bank account, an investment account, or a cryptocurrency account. The digital change can be invested, such as in publicly traded securities, or converted into cryptocurrency. The digital account of the customer can be previously associated with the physical-to-digital payment processing program.

In embodiments, the invention includes a system for converting physical change to digital cash at a point of sale between a point of sale merchant and a customer, the system comprising: a physical-to-digital cash processing program hosted on a remote server; a plurality of customer mobile devices, each of the customer mobile devices having an application program configured for two-way communication with the physical-to-digital cash processing program via the remote server; each customer mobile device associated with a customer account; a plurality of point of sale purchase devices, each of the point of sale purchase devices having an application program configured for two-way communication with the physical-to-digital cash processing program via the remote server; the customer mobile devices and the point of sale purchase devices configured to communicate with each other via the physical-to-digital cash processing program to thereby administer a plurality of sales transactions. In embodiments, administration of each of the sales transactions comprises: the customer initiating a purchase at a point of sale of a merchant; the customer paying for the item by making a physical cash payment; the customer selecting an electronic deposit of all or a portion of the amount of the customer's change in lieu of physical change; the merchant accepting the physical cash payment from the customer; the merchant calculating an amount of change owed to the customer; and the merchant using the physical-to-digital cash processing program to make an electronic deposit of the amount of change owed to the customer into a digital account of the customer.

The foregoing and other objects, features, aspects and advantages of the invention will become more apparent from the following detailed description of the invention when considered in conjunction with the accompanying drawings.

PREFERRED EMBODIMENTS OF THE INVENTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
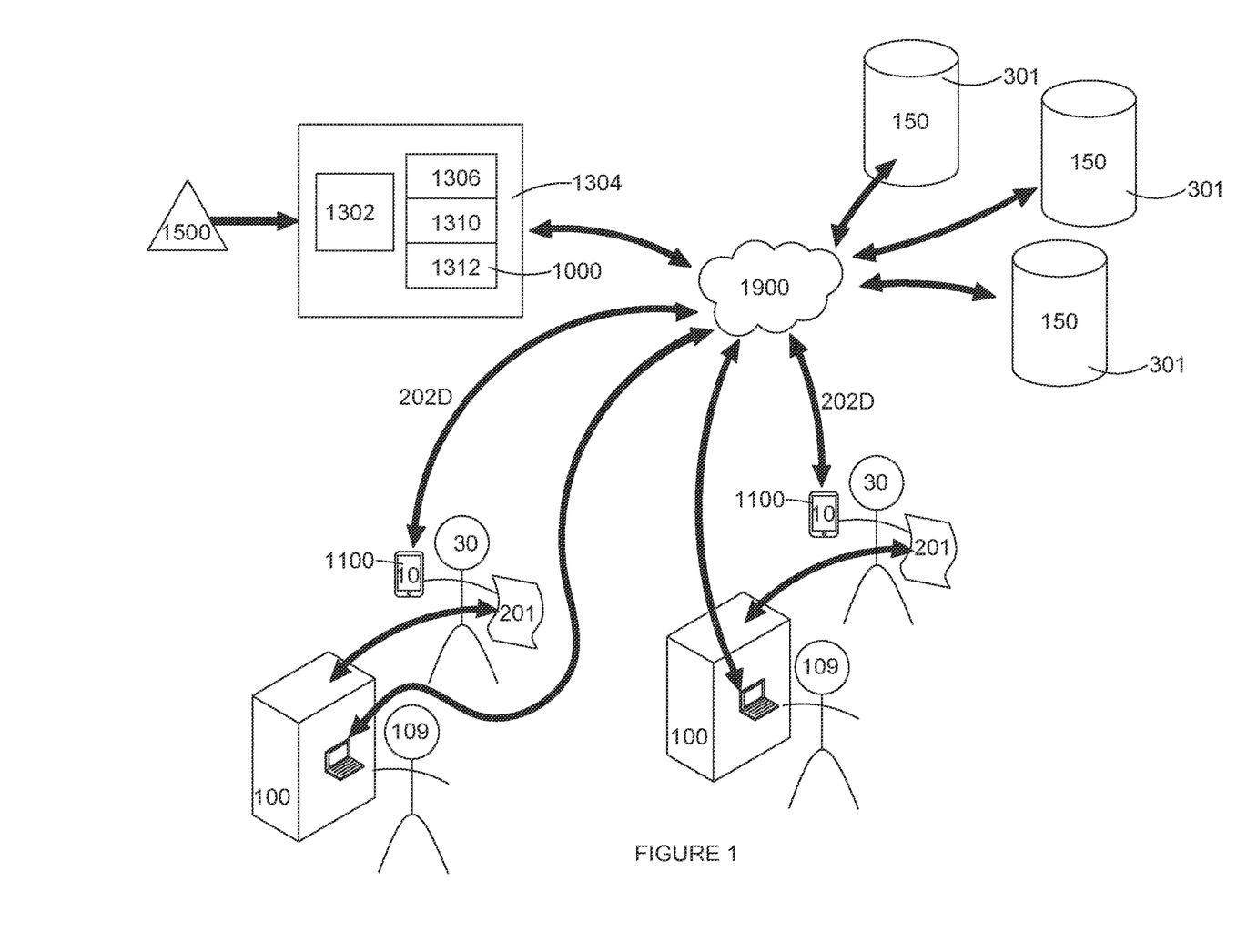
FIG. 1 is a schematic flow of one embodiment of a physical-to-digital payment processing system according to the invention, featuring an overview of physical and digital components of the system.

FIG. 1 is a schematic diagram of an embodiment of the system 1. As indicated in FIG. 1, the physical-to-digital cash processing system 1 of the invention includes a processing program 1000. The payment processing program 1000 will typically include an end-user mobile application 1100 which is downloaded to a plurality of mobile devices 10 of a plurality of users 30. The mobile device 10 will typically be a mobile phone, but other devices that connect to and interact with the Internet can also be considered mobile devices, such as computer tablets, laptops and the like.

As indicated in FIG. 1, operation of the system 1 via the conventional cloud 1900 is envisioned as being most efficient, although cloudless operations could be configured.

The system 1 includes a computing device 1300 implementing a physical-to-digital payment processing program 1000. The computing device 1300 can be any type of computing device, and can be composed of multiple computing devices. The computing device 1300 can include a conventional central processing unit (CPU) 1302 or a plurality of CPUs capable of manipulating or processing information. A memory 1304 in the computing device 1300 can be a random access memory device (RAM) or any other suitable type of storage device. The memory 1304 can include data 1306 that is accessed by the CPU 1302 such as via a bus. The memory 1304 can include an operating system 1310 and installed applications 1312. The installed applications 1312 include the physical-to-digital payment processing program 1000 that permits the CPU 1302 to perform the payment processing methods and operations described herein. The computing device 1300 can be associated with a database server, such as a cloud database server, for secure storage and retrieval of large amounts of data. The computing device 1300 can also include additional or secondary storage, for example, a memory card, flash drive, or any other form of computer readable medium.

The system 1 is provided by a service provider 1500. The service provider 1500 may maintain and operate the physical-to-digital payment processing system 1000 on external cloud-based servers and associated database servers. For example, the computing device 1300 can be a cloud computing service and operate over the cloud 1900. In embodiments, the physical-to-digital payment processing system 1 has a stand-alone platform. In embodiments, the service provider 1500 of the physical-to-digital payment processing system 1 builds partnerships with stores, such as big box retail stores, to integrate the system 1 into their existing point of sale architecture. The service provider 1500 will also work with third-party savings and payment providers such as Square Up and Venmo.

Use of the system 1 by customers 30 and vendors 150 will now be described.

Figure 2:
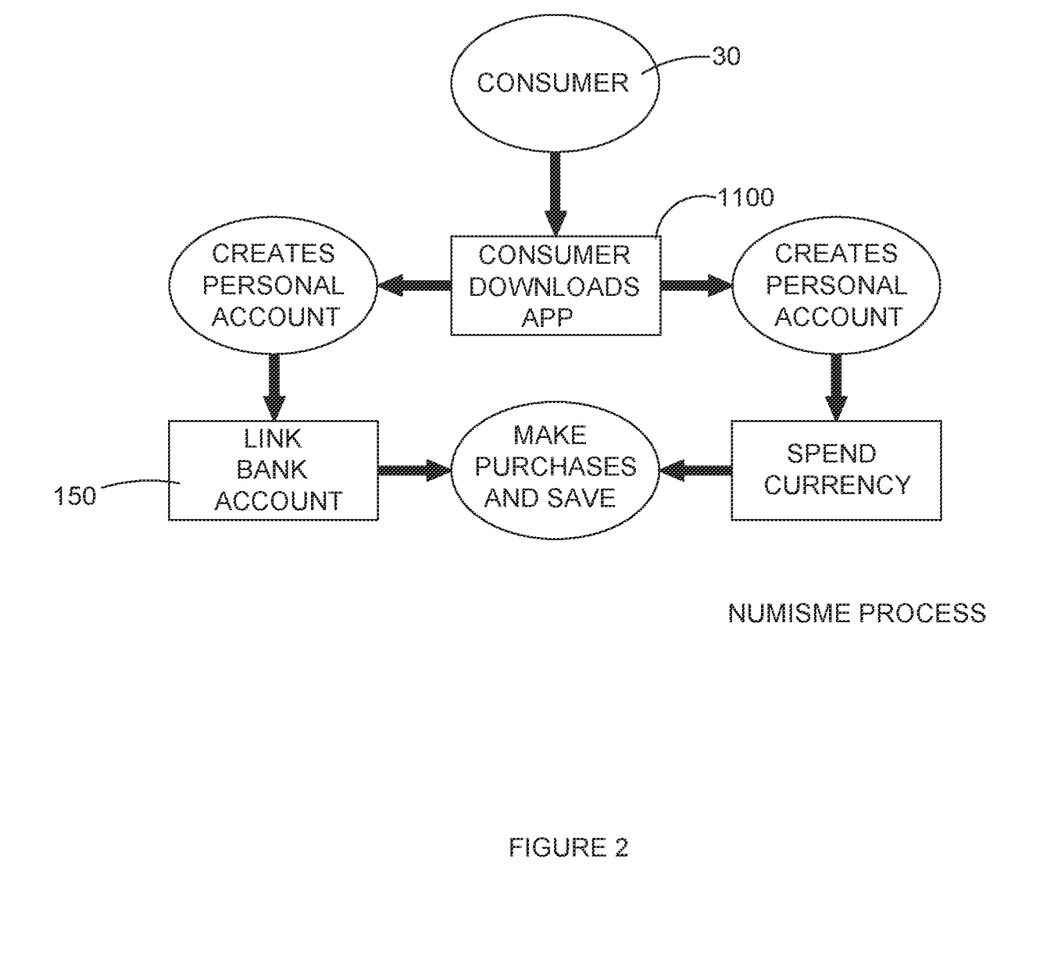
FIG. 2 is a flow chart of one embodiment of a cash processing system according to the invention, featuring set-up of a user's account with the system and basic operation.

As indicated in FIG. 2, the user 30 downloads the cash mobile app 1100 to his or her mobile device 10 from an app store such as iOS or Google Play. The user 30 registers one or more of the user's financial accounts with the cash app 1110. Examples of acceptable financial accounts include but are not limited to savings accounts, checking accounts, brokerage accounts, retirement accounts, bitcoin accounts and mobile payment apps (e.g. Venmo®).

Figure 3:
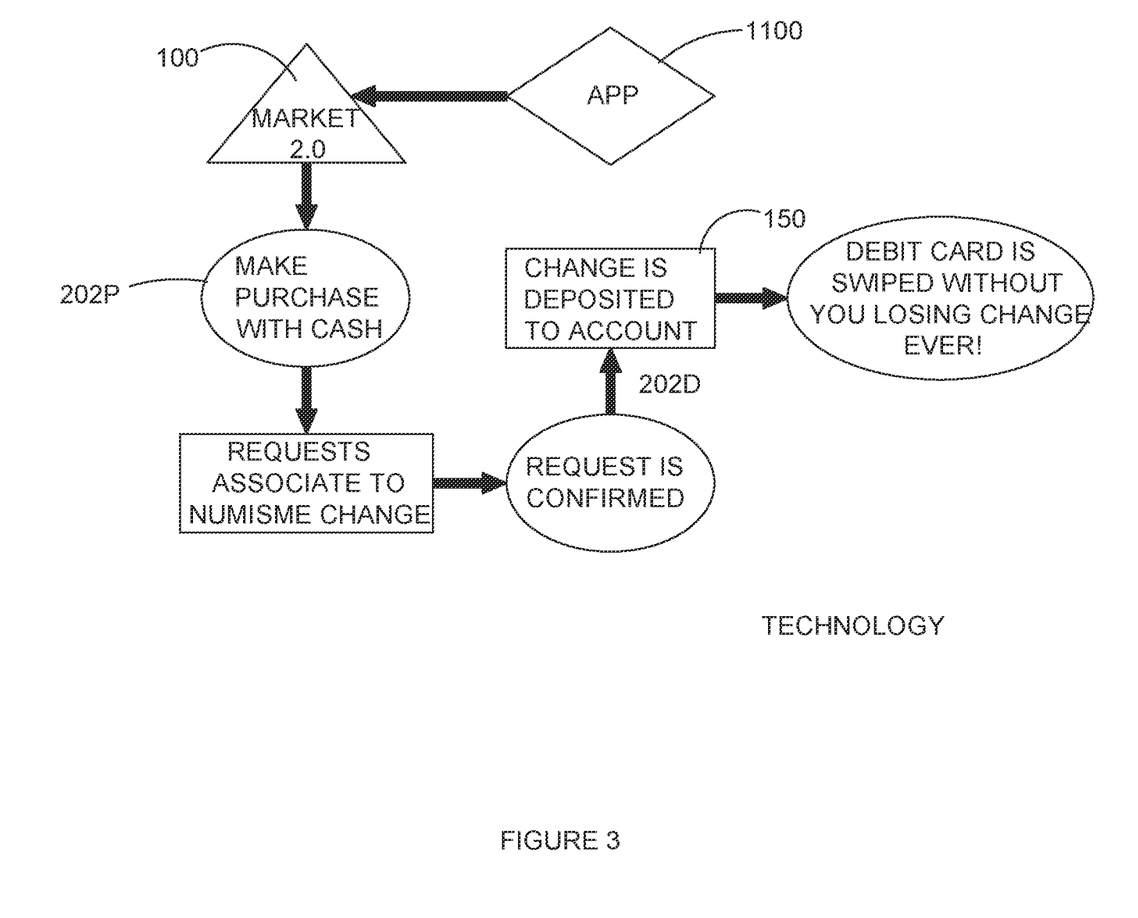
FIG. 3 is a flow chart of one embodiment of a cash processing system according to the invention, featuring a purchase transaction.
Figure 4:
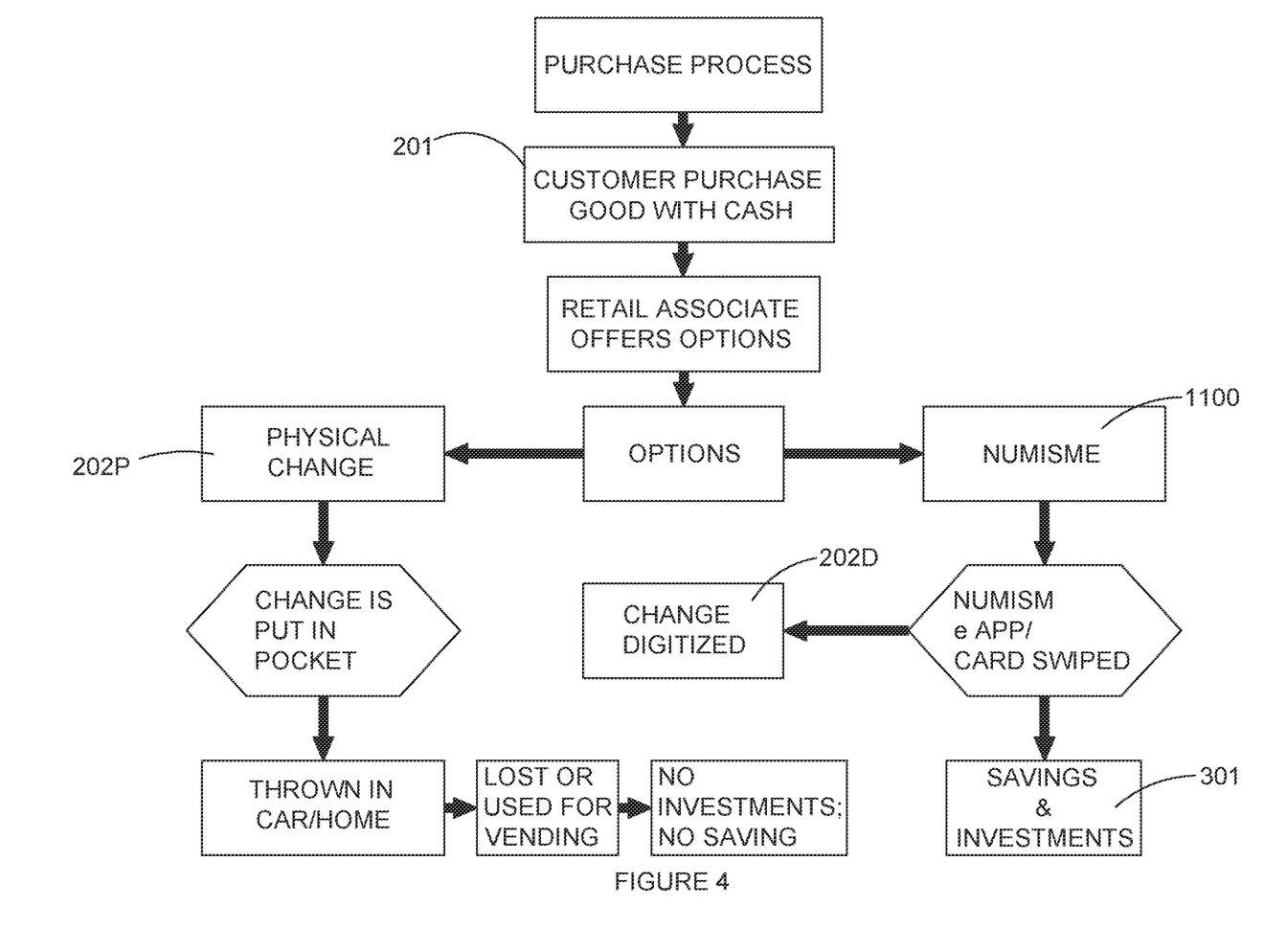
FIG. 4 is a schematic flow of one embodiment of a physical-to-digital payment processing system according to the invention, featuring post purchase processing of physical and digital change.
Figure 5A:
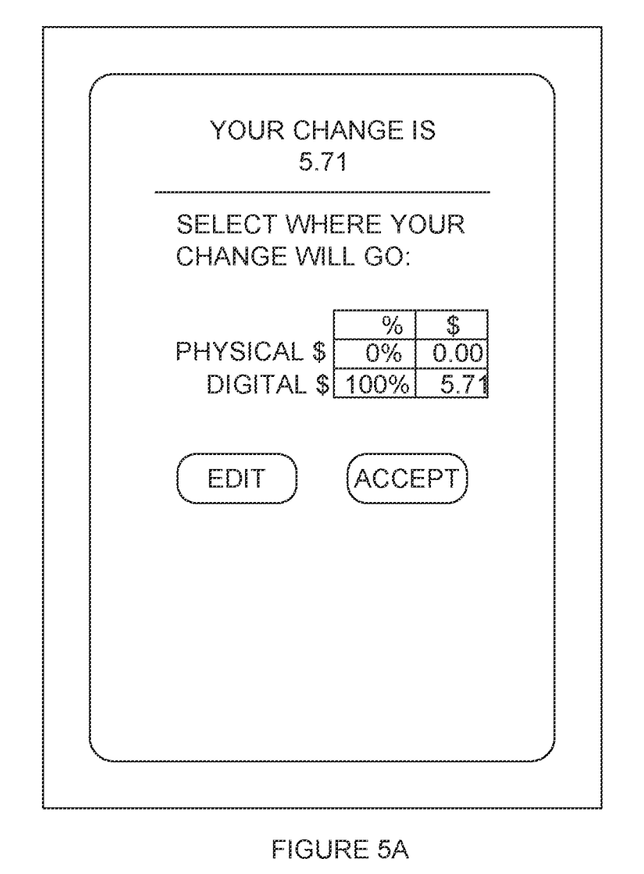
FIG. 5A shows one embodiment of a mobile device application screen for operation of the system by a user.
Figure 5B:
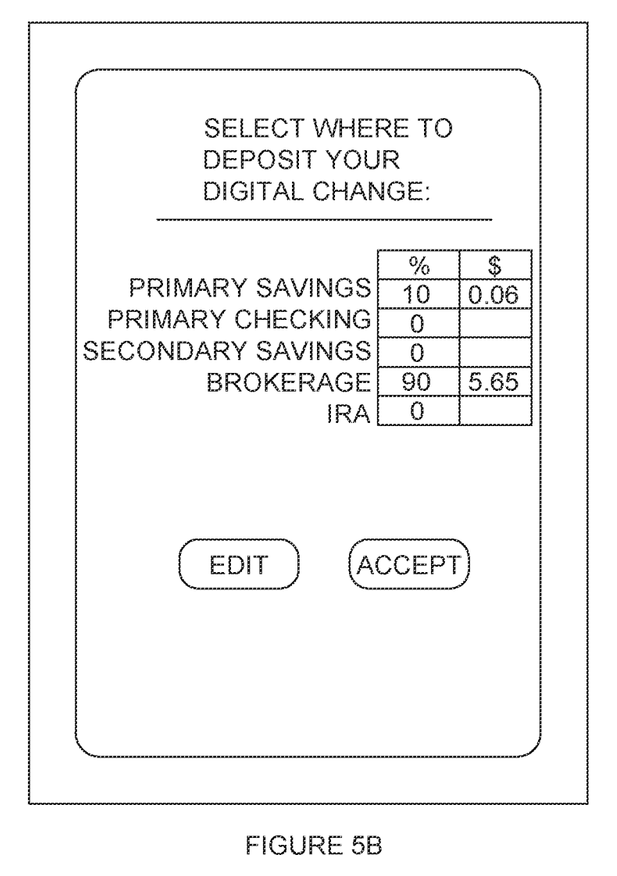
FIG. 5B shows one embodiment of a mobile device application screen for operation of the system by a user.

When the user goes to a store 101 that uses the physical-to-digital cash processing system 1, the app 1100 is ready for use. As indicated in FIGS. 3-4, the user makes a cash purchase at the point-of-sale 100, in the conventional manner. At this point in the sales process, the vendor 100 and the customer 30 have the option of using the system 1. Using the example used in the background section, the cashier 109 notifies the customer 30 about the amount and his/her options, such as: "Your change is $39.82. Do you want cash or e-transfer?" In one scenario, the customer 30 says, "Please transfer the entire amount to me." The customer 30 hands the cashier his/her preferred debit card or a card for the cash processing system 1 application, which can be a physical card or an electronic card on the customer's phone (e.g. Apple Wallet® or Google Pay®). For electronic card transactions, the user pulls out the mobile device 10 and opens the mobile app 1100. The system 1 connects the mobile app 1100 to the store's 101 processing system, typically via-cloud based interaction via the system 1.

The cashier swipes the customer's card or scans the customer's payment app. This triggers the underlying program 1000 to send all of the customer's change 202D to the customer's desired account 301 in electronic money format. The customer walks away from the transaction without ever touching or risking the loss of loose change 202P.

Alternatively, the customer 30 could instruct the cashier 109 to give him a certain amount of the change in physical money and to transfer the remainder to the customer's account in electronic money format. For example, the customer might say, "Please give me a twenty and transfer the rest to me." In this scenario, the cashier 109 hands the customer 30 a $20 bill and deposits the remaining $19.82 in the manner described above.

Instead of going to a bank to deposit cash, a user of the system 1 can simply go to a grocery store, make a small purchase, and then watch her change get deposited. Thus, the user deposits her cash while also completing her grocery shopping task. In addition to eliminating the habitual loss of cash change, the user also avoids the cost and inconvenience of a trip to the bank to deposit cash. Users will find many similar situations for benefiting from use of the system 1 while they are in the process of completing ordinary shopping errands. The system 1, when placed in widespread use, will result in many efficiencies, including reduction of trips to the bank and resulting savings of both time and energy usage.

Options for paying for the use of the system are described below.

No Cash Option

In one embodiment of the invention, participating stores 101 adopt a policy that they no longer distribute loose change to customers. A cashless change system will allow stores to save large amounts of money currently spent administering physical change, including labor/employment, security, accounting, balancing, purchasing from banks, security charges for delivery of cash to-and-from stores, theft, losses, and so forth. A cashless change system is particularly suited for big box stores, where economies of scale will result in substantial savings.

In cashless change stores, it is anticipated that customers 30 will soon learn and appreciate the benefits of the system. The cash processing system 1 will send a digital version of the customer's change 202D to the customer's 30 selected bank account, cash processing system account, brokerage account, bitcoin portfolio, or the like.

In a hybrid option, the store 101 can opt to provide a partial cash change option for customers who request it, while predominately promoting use of the cashless change option. In cashless stores 101, it is anticipated that the store will not charge a fee for use of the system, since the store is saving large amounts of money by not administering physical change.

Digital Environment

In addition to solving the hidden problem of the cost of managing physical change transactions, an additional goal is to create an environment that digitizes both the client's cash and their coins by creating a completely changeless system in which all change, cash or coin is digitized and transferred to the electronic medium. Thus, the cash processing system 1 fundamentally changes and redefines the concept of the conventional point-of-sale (POS) system.

With the cash processing system 1, a business will now only need to manage the physical cash and coins its collect 201, not the physical monies 202P that the business formerly distributed to customers. The store's POS machine/client app 1010 can be programmed with an automatic counter that keeps a balance of physical monies 202P collected and digital records of digital change 202D transferred out to the client's accounts. The store's POS machine app 1010 can be programmed to sort the collected physical change and cash 202P and have it ready to be delivered to banks. Security personal can come in at the end of day or week and pickup physical monies 202P from each machine and deliver the money 202P to the store's business bank account. This process will result in significant savings through automation and digitization.

Cryptocurrency

In embodiments, the cash processing system 1 has a cryptocurrency option allowing clients to invest in bitcoins with an auto invest option. The system 1 will create digital change 202D and use the money to buy bitcoins for the customer. This will build up crypto portfolios and increase blockchain adoption and capture interest in the cryptosphere. The system 1 can buy cryptocurrency through third-party apps, such as Cash. In other embodiments, the system can buy cryptocurrency directly by automatically transferring excess change to the user 30's cryto wallet. In embodiments, the system 1 will purchase cryptocurrency automatically in the user 30's crypto account. In other embodiments, the system will transfer the excess change to the user 30's crypto account, where the user will manually use the spare electronic change to buy cryptocurrency.

Register-Free Shopping

The system 1 of the invention enables a register-free environment for vendors. This feature may be particularly useful for portable vendors, such as vendors at a farmer's market or a flea market. In recent years, the introduction of portable credit card readers/square card readers has made it easy for portable vendors to receive electronic payments by credit or debit card. However, for cash payments, a portable vendor who does not have a cash register setup must carry a large amount of physical cash in multiple denominations in order to cover all eventualities. With the system 1 of the invention, the vendor can accept cash payments, put the entire purchase amount in his pocket, and pay back any change due to the customer by using the physical-to-digital cash processing system 1.

In embodiments of the invention, a customer of a small business that wants to pay for a purchase in cash can use the merchant's square card reader in reverse to receive their change from the purchase transaction. This can be characterized as a "Reverse Swipe." The client pays with his/her cash and if there is any change due, they will get the entire change sent to their bank account by providing their debit card, system card, system app, phone number, email address or other information sufficient to transact the reverse swipe into the customer's account via the system 1. The reverse swipe feature makes the process convenient for the small vendor by not having to carry a register to pay change back to customers. The reverse swipe feature makes it easy for the customer to get all their money back and deposited directly into their bank account while they buy their desired product. The system 1 can be configured such that as long as the vendor/merchant is a client of the system 1, the customers can provide any debit card of their choosing (such as if they have multiple bank accounts) and the money will transfer to that particular bank account. Alternatively, a customer can use their system 1 specific debit card or the system mobile app 1100 to send the change to their system 1 account. The customer can elect to leave the deposited digital change on their system 1 specific card and use the system specific card 1 as a debit card. Alternatively, the customer can use the stock/crypto investment option preset by them or transfer the digital change to a connected bank account. The system 1 specific card can be physical or be a part of the system mobile app 1100 on their phone.

This reverse swipe concept can be used with other configurations described herein, such as big box store debit cards or apps, with the advantage of allowing clients to decide in-app where to store, send or invest accumulated digital change.

Card Options

Even in the digital age, some customers refuse to use credit cards or mobile payment systems. To cover customers, cards can be made available that are specific to the physical-to-digital payment processing system 1. To cover everybody including people that do not have a debit card/bank account, POS locations 100 can carry cash processing system 1 cards or use the virtual cards on mobile devices. A customer 30 can easily receive money on that card immediately, like a gift card, even prior to registering to use the system. In their own time, the customers can sign up and register the card. The cards act like gift cards if not registered and the cash value on them can be utilized with or without registering the card. By registering the card with the system 1, it acts as the customer's official card that can be linked to their bank to allow transfers and investment options.

To cover everybody including people that do not have a debit card/bank account, POS locations can carry system 1 specifics cards or big box/store specific cards or use the virtual cards on their mobile phone device. In this way, a customer can easily receive money on that card immediately, like a gift card, and in their own time they can sign up and register the card with the system 1. Such cards act like gift cards if not registered, and the cash value on them can be used with or without registering the card. By registering the card, the card acts as the customer's official card that can be linked to their bank to allow transfers and investment options.

Pricing Structure

Various systems can be used to pay for use of the physical-to-digital cash processing system 1. In embodiments, the software provider 90 or the vendor 101 can elect to provide the system free of charge, or it can charge fees in various ways. For example, the vendor 101 can charge a periodic fee, such as a monthly fee of $1 for basic deposits to a bank account. Different tiers of service can require higher monthly fees, such as for access to multiple types of accounts. The system 1 can charge higher or lower amounts per month depending on the amount of money deposited. For example, if the user has $1 million in a savings account with the vendor, the monthly fee might be waived. If the user has $1 million in a managed broker account, the fee might be $100 per month to cover the cost of management fees. In advertising subsidized embodiments, fees can be lowered or even waived if the user accepts the intrusion of ads on the customer app 1010.

Fees can also be charged on a per-transaction basis, such as a certain percentage of electronic change deposits. Hybrid payments systems can also be used, such as a $1 per month fee plus 0.1% of each deposit.

If a physical store 101, such as a big box store, moves to a one hundred percent cashless change system, it is anticipated that the store will not charge a fee to use the physical-to-digital cash processing system 1. As noted above, this system eliminates theft of money because physical cash payments 201 are deposited into a cash register 110. However, no physical change 202P is withdrawn from the register. Employees never opens the register, and the store greatly diminishes the amount of money that will be lost to theft.

For small businesses, such as gas stations and brick-and-mortar retail stores, the client business 101 may charge the end user 30 a small "convenience fee" for use of the physical-to-digital cash processing system 1. For example, a customer at a gas station pays with five dollars cash and his change is 83 cents. The customer decides not to take the 83 cents in cash because he thinks he will misplace it, so the customer asks for an electronic cash deposit 202D. The customer 30 provides a debit or credit card or the cash processing mobile app 1100 for the vendor to swipe. The system 1 digitally deposits 83 cents into the user's selected account. Once the money has been digitally deposited, the customer 30 has the option to keep it in the processing system 1 account or move it to another account. In this scenario, a small 3 percent convenience fee would be negligible to each individual customer. However, when multiplied by hundreds of transactions, the system collects a substantial amount of money, which can be divided between the small business retailer and the provider of the system 1, depending on the arrangement. If a customer has a higher change amount, let's say 10.83, and does not like the idea of paying 3 percent of the whole amount, he can ask to be given $10 in cash and take the remaining 83 cents as a digital deposit. In this scenario, a three percent fee is miniscule on the 83 cents, particularly since the user figures he or she will lose track of the physical change.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A method of managing administration and storage of physical cash by merchants and minimizing loss of physical change by customers resulting from point of sale purchases in cash but not credit or debit cards by customers at merchants, thereby alleviating the need to return change owed by merchants to customers in physical cash and providing an option to return at least a portion of the change owed by merchants to customers as electronic money into registered financial accounts of customers, comprising:

providing a physical-to-digital payment processing program for depositing cash into customers' registered financial accounts through an end-user mobile application device based on amounts of physical cash owed to customers on point of sale purchases at merchants, the processing program is hosted on a computing device on a remote host server, the processing program is provided and administered by an off-site service provider, providing an end-user mobile device application of the physical-to-digital payment processing program, the end-user mobile device application configured to enable interactive use of the physical-to-digital payment processing program by customers and merchants at a point of sale;

a customer downloading the end-user mobile device application to a mobile phone of the customer, the customer registering at least one financial account of the customer with the physical-to-digital payment processing program via the end-user mobile device application, a merchant downloading the end-user mobile device application to a point of sale device processing system of the merchant, the merchant registering a financial account of the merchant with the physical-to-digital payment processing program via the end-user mobile device application, the customer initiating a purchase at a point of sale of the merchant;

the customer paying for the purchase by making a physical cash payment, resulting in an amount of change owed by the merchant to the customer;

the merchant accepting the physical cash payment from the customer;

the point of sale processing system of the merchant determining the amount of change owed by the merchant to the customer;

the customer selecting a selected portion of the amount of change owed by the merchant to the customer to be electronically deposited to the end-user mobile device application on the customer's mobile phone of the customer and selecting a remaining portion of the amount of change owed by the merchant to the customer in physical cash, the merchant, via the end-user mobile application, using the physical-to-digital payment processing program to make an electronic deposit of the selected portion of the amount of change owed by the merchant to the customer from the registered financial account of the merchant into the customer's end-user mobile application;

the physical-to-digital payment processing program facilitating a transfer of the selected portion of the amount of change owed by the merchant to the customer from the end-user mobile device application to the registered financial account of the customer;

the merchant providing the remaining portion of the amount of change owed by the merchant to the customer in physical cash; and wherein the physical-to-digital payment processing program interfaces between the point of sale processing system of the merchant and the mobile device of the customer via a cloud.

2. The method of claim 1, wherein the financial account of the customer is a bank account.

3. The method of claim 1, wherein the financial account of the customer is an investment account, and further comprising the customer investing the selected portion of the amount of change owed by the merchant to the customer in publicly traded securities.

4. The method of claim 1, wherein the financial account of the customer is a cryptocurrency account, and further comprising the customer converting the selected portion of the amount of change owed by the merchant to the customer into cryptocurrency.

* * * * *